Figure 1:
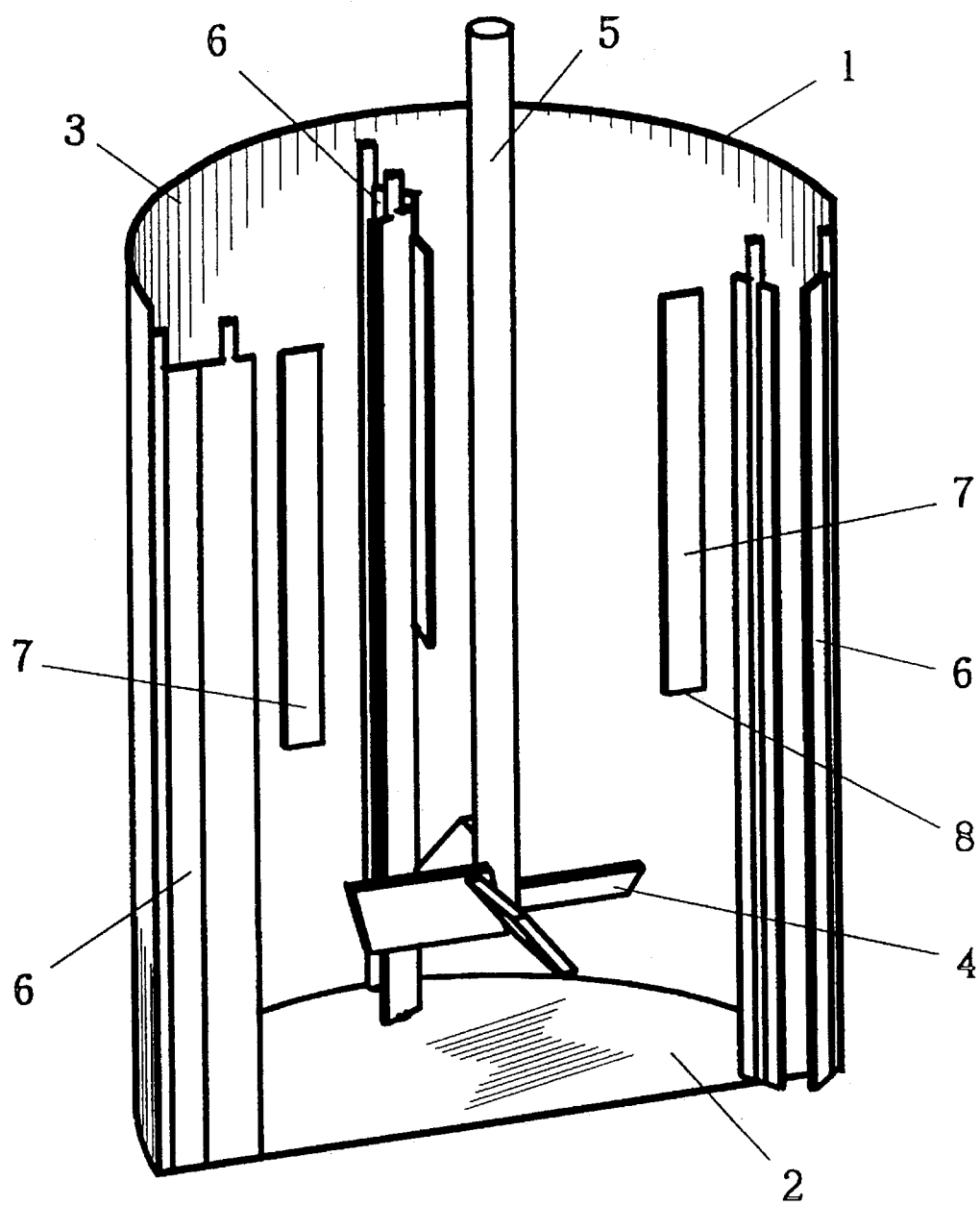

United States Patent [19]

Hulthom et al.

[11] Patent Number: 5,549,854
[45] Date of Patent: Aug. 27, 1996

[54] METHOD AND APPARATUS FOR FORMING CONTROLLED VORTEXES AND FOR RECIRCULATING GAS

[75] Inventors: Stig-Erik Hulthom; Launo L. Lilja; Valto J. Mäkitalo, all of Pori; Bror G. Nyman, Ulvila, all of Finland

[73] Assignee: Outokumpu Engineering Contractors Oy, Espoo, Finland

[21] Appl. No.: 442,009

[22] Filed: May 16, 1995

[30] Foreign Application Priority Data

May 20, 1994 [FI] Finland ................................. 942340

[51] Int. Cl.⁶ ................................................ B01F 3/04
[52] U.S. Cl. ........................... 261/87; 261/91; 261/123
[58] Field of Search ............................... 261/87, 91, 123

[56] References Cited

U.S. PATENT DOCUMENTS

| | | | |
|---|---|---|---|
| 3,092,678 | 6/1963 | Braun | 261/87 |
| 3,722,679 | 3/1973 | Logue | 261/87 |
| 4,263,143 | 4/1981 | Ebner et al. | 261/87 |
| 4,378,436 | 3/1983 | Heine et al. | 261/123 |
| 4,692,244 | 9/1987 | Supp et al. | 261/123 |
| 5,006,283 | 4/1991 | Schutte et al. | 261/123 |

*Primary Examiner*—Tim R. Miles
*Attorney, Agent, or Firm*—Brooks Haidt Haffner & Delahunty

[57] ABSTRACT

The invention relates to a method for forming controlled vortexes and for circulating gas thereby in a reactor (1, 15) containing liquid or a suspension of liquid and solids. Into the reactor there is also fed gas, so that the liquid is set into a turbulent motion by means of mixers (4, 17, 18) and flow baffles (6, 17, 19). By means of adjustable flow baffles (6, 19), there are created in the reactor at least two vortexes (10), external to the mixer shaft, for sucking gas from the suspension surface into the liquid phase.

12 Claims, 4 Drawing Sheets

METHOD AND APPARATUS FOR FORMING CONTROLLED VORTEXES AND FOR RECIRCULATING GAS

The present invention relates to a mixer reactor, particularly to a reactor which uses gas as the process chemical with a high coefficient of efficiency. In the said reactor, there is prevented the formation of a single turbulence, typical of reactors without flow baffles, formed mainly around an axis of a mixer member rotating in the middle of the reactor and often extending as far as the mixer member itself. The effective, gas-sucking character of this kind of turbulence is maintained in the present invention, but at the same time it is ensured that there are several turbulences, that they are controlled and do not extend to the immediate vicinity of the mixer member. The apparatus of the invention comprises adjustable flow baffles installed inside the reactor, by means of which baffles several controlled turbulences can be formed in the reactor, in order to suck gas from the liquid surface into the liquid phase.

Normally mixer reactors are provided with flow baffles attached to the walls of the reactor. Usually there are four baffles, and their purpose is to eliminate for instance the gas-sucking central turbulence, which is often considered harmful. When for instance a solution present in the reactor should be oxidized, the task is generally carried out by feeding into the effective range of a highly dispersing mixer member some oxidizing gas, such as air or oxygen. If the gas is air, it may not be practical and sometimes not even recommendable to suck it back into the solution from above the liquid surface, because then the nitrogen content in the solution only grows. On the other hand, when the oxidizing gas is oxygen, it is even economically advantageous to obtain it back into circulation. Thus the oxidizing can be carried out as was explained above, i.e. by making use of a dispersing mixer member, but in addition to this, it is advantageous in one way or another to suck the unreacted oxygen from above the surface back into the solution.

If the reactor is cylindrical and arranged in a vertical position, the mixer member is made to rotate by intermediation of an shaft installed on the central shaft of the cylinder part of the reactor. If the useful capacity of the reactor is such that the height of the liquid to be mixed is of the same order as the reactor diameter, it generally suffices to have one mixer member provided at the bottom end of the shaft. The direction and force of the power effect of the mixer depends on the type and shape thereof. There are mixers where almost the whole output is consumed in circulating and transporting the solution to be mixed. Normally processes require mixing, which is composed of both strong turbulences and sufficient circulation. If the useful capacity is so large that the solution height is 1½–2 times the reactor diameter or larger, there are often required several mixer members placed on top of each other at suitable intervals. Then there can be provided different types of mixers on the same shaft.

In the prior art there are known reactors where the above mentioned, often harmful strong gas turbulence rotating on the central shaft is prevented by means of four flow baffles located on the reactor wall. There is often left a flow aperture on the wall side of the flow baffle, for instance in order to prevent the accumulation of solid particles.

In the prior art there are also known other types of flow baffle structures, which are used for preventing a gas-sucking turbulence or even turbulences that are considered harmful. The U.S. Pat. No. 4,800,017 describes an apparatus where air is fed through the shaft to a dispersing mixer, a rotor, and the flow baffles are installed in the immediate vicinity of the rotor in order to intensify the dispersion.

It is also known that the power required by the mixer increases when the flow baffles hindering rotation are added to the reactor. In the FI patent specification 77,384, the flow baffles are designed to be helical, and the purpose has been to form a flow baffle structure whereby a maximal mixing effect is achieved with a minimal power demand.

Another prior art technique is to suck gas from the surface according to the so-called down-draft principle. The U.S. Pat. No. 4,454,077 describes an apparatus where for the down-pumping of gas through the central tube, there is used a mixer member resembling a two-headed screw, and the apparatus also includes upper and lower flow baffles. The U.S. Pat. No. 4,328,175 introduces an apparatus of a similar type, but the top end of the central tube is formed to be conical.

On the other hand, in the FI patent publication 91,365 it is specifically desired to prevent the formation of foam and turbulences, as well as the suction of gas from the surface. In order to achieve this, there is used a radially feeding mixer and possibly a flow baffle structure having the shape of a wing profile and extending only to the top part of the reactor.

In these known applications, the aim has been either to eliminate the turbulences, i.e. to stabilize the liquid surface, or the opposite, to boost a strong central turbulence formed on the mixer shaft, i.e. to intensify the suction of the gas into the solution. In the latter case, the gas sucked in by the strong central turbulence, i.e. vortex, proceeds into the mixer. This strong and capacious gas turbulence carries gas from the surface into the liquid to be mixed, sometimes very effectively, but at a certain gas rate the operation of the mixer member declines, as the mixer begins to rotate in a large gas bubble. Now, along with the weakening of the power, the turbulence also weakens and the gas suction is reduced. However, the vortex created in the above described manner is uncontrolled, and when extending as far as the mixer member, it causes strong power changes and consequent damage to the equipment.

The novel method and apparatus of the present invention for forming controlled vortexes in a reactor is based on an arrangement of the flow baffle members, the object whereof is to eliminate the drawbacks of the prior art constructions described above and to achieve a new, more efficient and operationally more secure gas suction in the reactor from the surface of a liquid or a suspension of liquid and solids into the liquid phase, and at the same time to achieve an efficient flow field with respect to the mixing, which leads to an increased efficiency in the use of gas. The apparatus of the invention comprises flow baffles installed adjustably inside the reactor, which flow baffles are sufficiently high in order to create effective vortexes. The essential novel features of the invention are apparent from the appended patent claims.

According to the invention, the reactor contents to be mixed, such as a liquid or a liquid plus a mainly pulverous solid, are set into contact advantageously by feeding a controlled amount of gas into the effective range of the mixer/mixers, and by sucking the gas by means of several strong vortexes from above the liquid surface. In an oxidizing situation, the reaction gas is an oxygen-bearing gas, air or advantageously oxygen. The advantage of the method becomes apparent for instance in cases where oxidizing is carried out with pure oxygen, because now, when sucking from the surface of the liquid phase, the amount of inert gas, mainly nitrogen, is not increased in the liquid phase. In these cases it is advantageous to use a closed gas space in the top part of the reactor in order to recover all of the gas being used.

The situation is similar also in other cases where it is desired to use the infed gas accurately and with a high efficiency. As an example, let us point out reactors using other gases, such as hydrogen and sulfur dioxide. The process in question can be for example the production of metal powder directly from a metal-bearing solution, or a reduction of some solution component from one state to another. As an example of the latter case, let us mention chromium (VI), which is harmful to the environment and is therefore reduced, the employed reductive agent often being the said $SO_2$ gas.

When using poisonous gas chemicals, such as hydrogen sulfide, it is important to consume all of the gas. Thus it is advantageous to operate with a reactor where the gas can be circulated from the gas space back into the solution. There also are cases where the purpose is to dilute the reacting gas with an inert gas. The process in question may be for instance the said sulfide precipitation with hydrogen sulfide, in which case the selectivity of the precipitation reaction can be increased by adding some inert gas, such as nitrogen. Now the employed hydrogen sulfide is diluted with nitrogen, and there is consequently avoided a strong local precipitation, which often coprecipitates undesirable solution components, too.

The present invention also includes a reactor type with an open gas space, which type can be used for aerating solutions or slurries. Through sub-turbulences, the reactor sucks new air to the solution, thus itself changing its air contents, while the used air is separated in rising bubbles to the surface and let out of the reactor space. Such reactors are needed for instance to remove the last fails of gas after gas treatment, before the next step. Another possibility is oxidation with air; then it is advantageous that a separate air feeding arrangement is not needed in cases where pressurized or blasted air cannot be used.

The advantageous nature of the method and apparatus of the invention is particularly apparent as regards controllability. First of all, the amount of reaction gas fed into the reactor contents is exactly the amount that the mixer member/members tolerate without losing the power required for mixing. Secondly, the gas sucked in from the liquid surface of the reactor is not immediately conducted in large amounts to near the mixer, to spoil the controlled mixing effect. According to the invention, there are formed several controlled vortexes, and therefore the liquid phase and the gas to be sucked from the surface thereof obtain a large surface owing to these narrow vortexes. Moreover, the suction vortex is arranged to function so that it is composed of alternately sucking and "milking" sub-turbulences.

One prerequisite for the turbulences is that the liquid contained in the reactor is set into rotating motion. If the reactor does not contain any flow baffles at all, on the central axis of the reactor there is formed the above described strong gas turbulence, vortex, which may, owing to a sufficient rotating energy, extend as far as the mixer member causing the rotation. In the radial direction, the mixer member can be totally or partially flow-creating. The formation of a central vortex is prevented by means of two or more, advantageously at least four, radial flow baffles provided on the outer area of the reactor. By moving the flow baffles towards the center, at least partly, nearer to the central axis, and by simultaneously leaving in between the flow baffle and the reactor wall an aperture which allows the flow to rotate, there is obtained a strong turbulence sucking air from the surface in the section subsequent to the flow baffles. In addition to this, at least part of the flow baffles can be located in the area between the mixer and the liquid surface only.

The turbulence-creating effect of a flow baffle can be increased by suitably adjusting the shape of the baffle.

It is essential of the invention that there are used adjustably installed flow baffles with a sufficient height with respect to the formation of vortexes. It is advantageous to simultaneously use at least two types of adjustable baffles, at least part of which are adjustable. The flow baffle located nearer to the reactor wall is advantageously formed of two parts, of which the outermost, i.e. the one located on the wall side, is adjusted around an axis located on the wall side, i.e. on the edge of the flow baffle. Now the efficiency of the rotation of the liquid, and thus the formation of the vortex, can be increased by setting the flow in a strong turbulent motion towards the vortex-creating, mainly stationary baffle, which constitutes the second part of the wall-side baffle.

In addition to the baffles installed essentially in the reactor wall, the reactor can be provided with flow baffles that are advantageously located in the space remaining in between the wall flow baffles and the mixer, and by means of which the rotation of the liquid can be boosted or slowed down, according to the needs of the situation. In principle these flow baffles are stationary and extend advantageously to the area located in between the liquid surface and the mixer.

One application of the reactor of the invention is an autoclave, which naturally can be of a so-called bedded form, and have several divisions. The cross-section of one division is rectangular, and on the vertical plane u-shaped. The vortexes sucking gas from the surface are achieved by means of similar flow baffle arrangements as was explained above.

Figure 2:
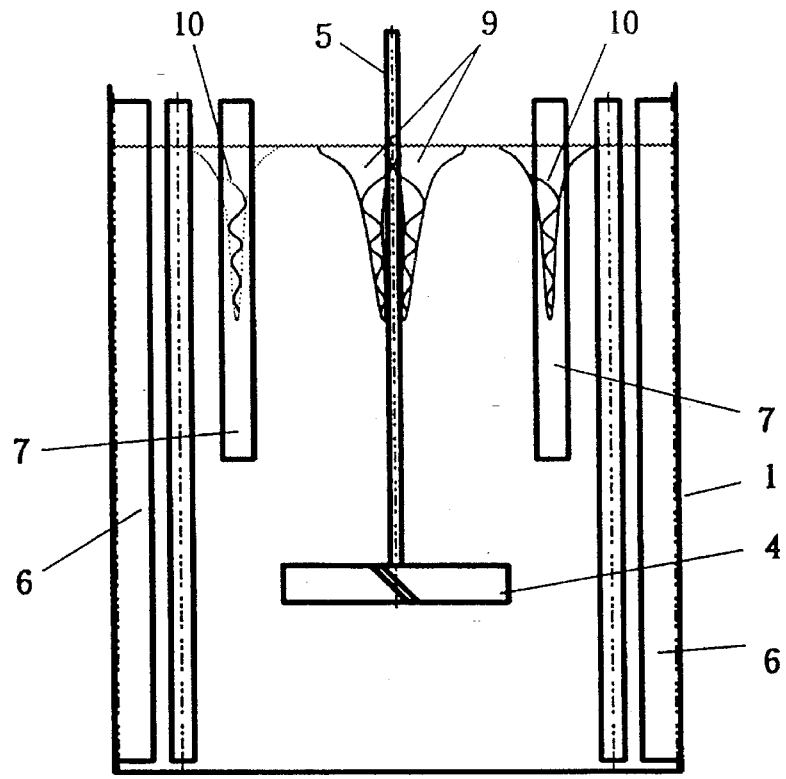
Figure 3:
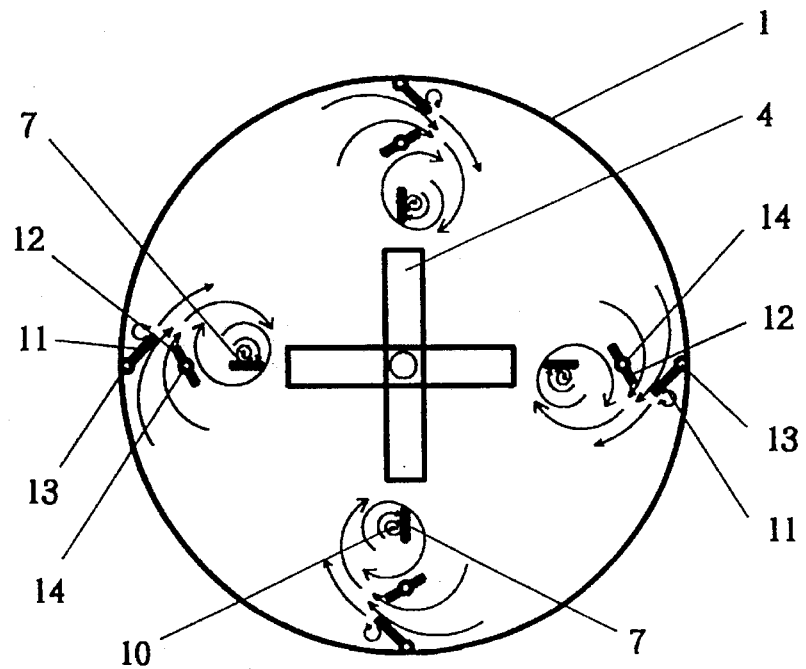
Figure 4:
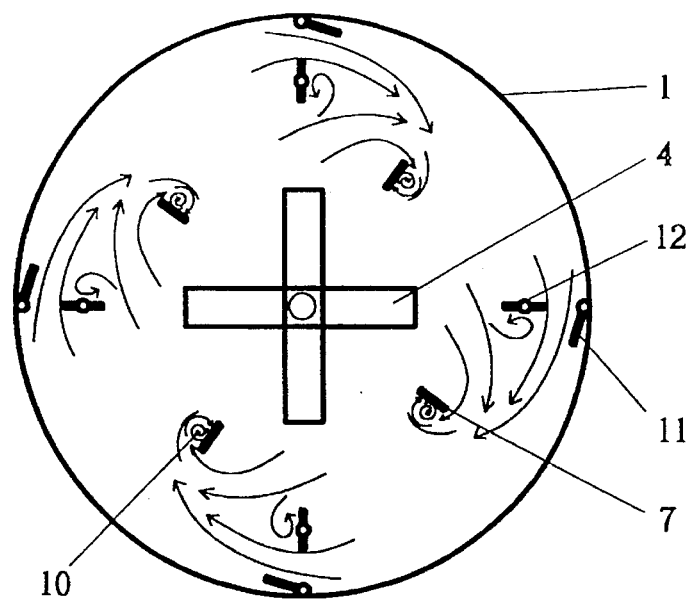
Figure 5:
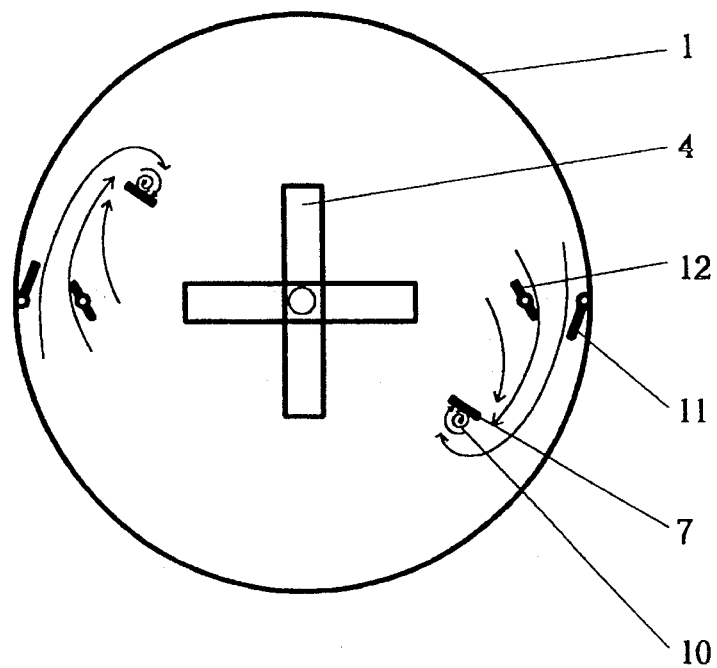
Figure 6:
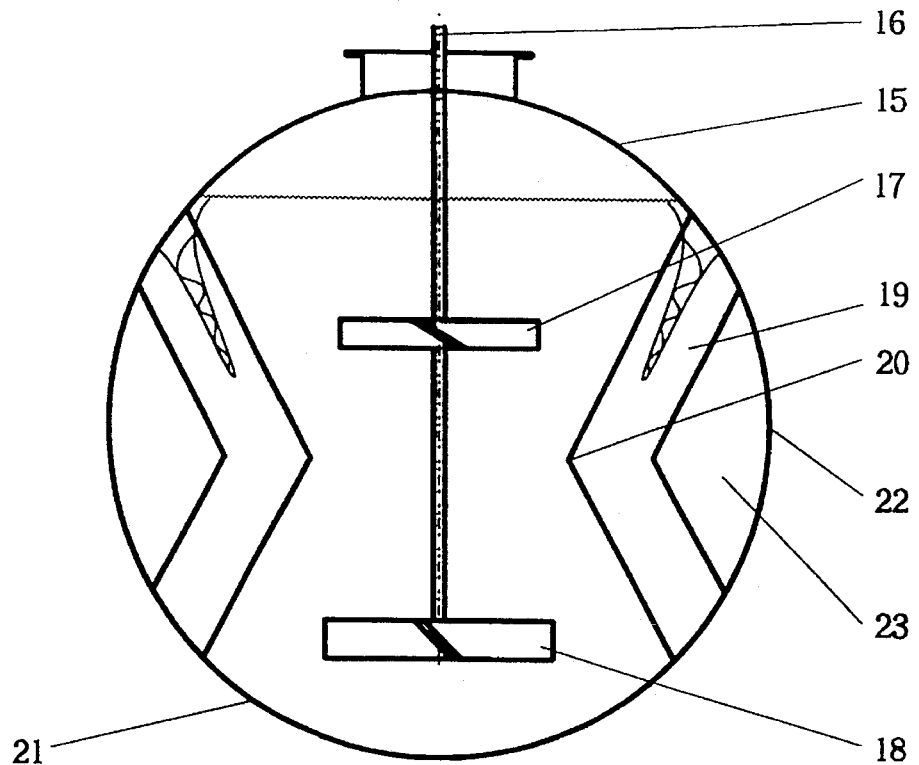
Figure 7:
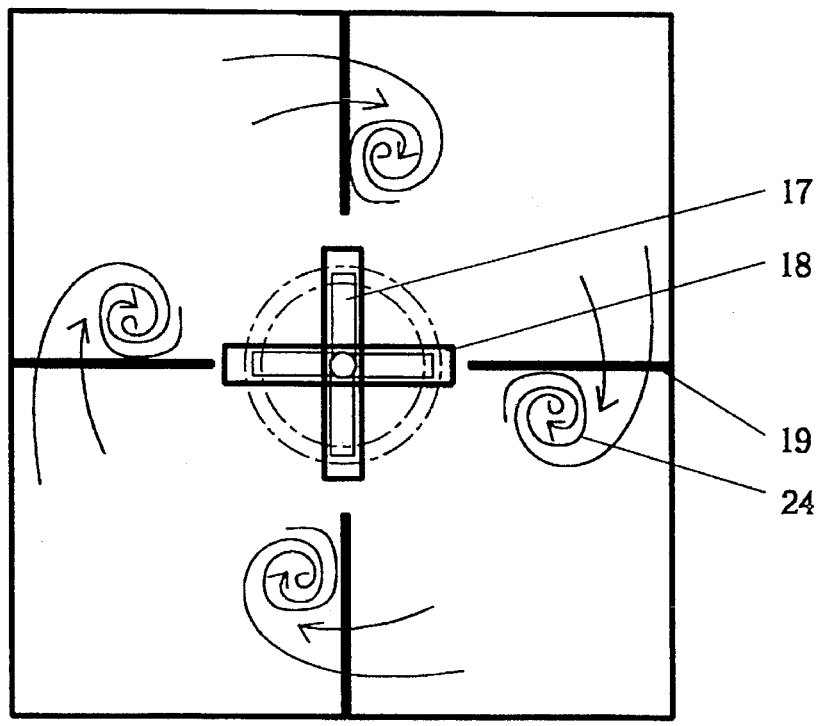

The apparatus of the invention is described in more detail below, with reference to the appended drawings, wherein FIG. 1 illustrates a preferred embodiment of the vortex-forming construction of the invention in a mixer reactor as a three-dimensional side-view elevation, FIG. 2 illustrates a vortex boosting construction of the invention as a side-view elevation, FIG. 3 shows the embodiment of FIG. 2 as seen from the top, FIG. 4 illustrates a modification of the embodiment of FIG. 1, provided with four flow baffle systems, as seen from the top, FIG. 5 illustrates another modification of the embodiment of FIG. 1, a reactor provided with two flow baffle systems, as seen from the top, FIG. 6 is a side-view illustration of the application of the invention for an autoclave construction, and FIG. 7 illustrates the construction of FIG. 6 as seen from the top.

It is seen in FIG. 1 that a reactor 1 comprises a bottom 2 and a cylindrical wall part 3. The reactor may be open or closed, but a lid is not illustrated in the drawing. Naturally the reactor may be of some other type, too, for instance angular. A mixer 4 is suspended from a shaft 5, and essentially near to the reactor wall there are located, in the exemplary situation of the drawing, four specially constructed and essentially vertical flow baffles 6, which extend from top to bottom, at least to the height of the mixer, generally as far as the bottom 2. In the space formed in between the flow baffles located on the wall and the shaft installed essentially in the middle part of the reactor, there also are provided additional flow baffles 7, which are positioned in the vertical direction of the reactor so that a bottom edge 8 thereof advantageously remains above the mixer 4, in the vicinity thereof.

FIG. 2 illustrates how a vortex 9 is created around the shaft 5 while the mixer 4 rotates, but particularly the additional flow baffles 7 prevent the vortex from reaching down as far as the mixer. Instead of this, around each additional baffle 7, there is formed a separate effective vortex 10. The central vortex 9 and the vortexes 10 caused by the additional flow baffles 7 achieve a suction from the surface of the reactor contents towards the inside, and thus the gas located on the surface of the liquid is well sucked into the liquid. The feeding of gas into the reactor is not separately illustrated in the drawings, but it takes place in a conventional fashion, for instance through a mixer shaft, and the embodiment of the invention concentrates in boosting the gas circulation and suction from the liquid surface into the liquid.

FIG. 3 illustrates in more detail what was already apparent from FIGS. 1 and 2: the wall flow baffles 6 are formed of two elements 11 and 12, at least one of which is movable around its vertical adjusting axis. In the embodiment of FIG. 3, the position of an outermost element 11 is adjustable essentially in relation to its axis 13 located on the reactor wall, and an innermost element 12 of the flow baffle is movable in relation to its centrally positioned adjusting axis 14. By changing the mutual positions of the elements 11 and 12 of the flow baffle, the direction and depth of the vortex formed around the additional flow baffle 7 can be adjusted. In the case of FIG. 3, the elements 11 and 12 of the baffle almost touch each other, so that the flow is discharged through the aperture as sharp and narrow flow. Now the range of the flow is fairly limited, and the additional flow baffles 7 are located in the immediate vicinity of the elements 11 and 12 of the wall flow baffle.

In FIG. 3, the additional flow baffles 7 are located radially on the same spots as the wall flow baffles 6, but the position of the additional flow baffles in relation to the wall flow baffles can be adjusted, i.e. they can also be arranged somewhere else in the reactor. FIG. 4 illustrates a situation where the additional flow baffles are still located in the area left in between the wall flow baffles 6 and the mixer 4, but they are not in the same line with the wall flow baffles. In this case the innermost part 12 of the wall flow baffles is essentially parallel to the reactor radius. Experiments have shown that this positional arrangement results in strong and far-reaching circulations, which help strengthen the vortexes 10 formed behind the additional flow baffles 7.

In the embodiment of FIG. 5, there are used only two flow baffles 6 proper and two additional flow baffles 7 located in a modified position with respect to the former.

FIGS. 6 and 7 illustrate the creation of vortexes according to the invention in a closed autoclave arrangement, but the essential features of this embodiment also apply for an open model. As is seen in FIG. 6, in the autoclave 15 there are located two mixers 17 and 18 on the shaft 16. The wall flow baffle consisting of several parts, described in the previous embodiments, is here combined into one inwardly bent knee-shaped flow baffle 19. The knee 20 directed towards the center of the reactor extends furthermost in the area in between the two mixers. The angle of the knee can be adjusted according to the situation. It is obvious that on the same shaft, there can be installed more than two mixers, and in that case in the reactor there are arranged flow baffles provided with a knee at least in one interval in between the mixers.

Apart from the fact that the angle of the knee 20 and its shape, which also can be rounded, may be adjusted, also the position of the flow baffles in the reactor is adjustable. In the vertical direction, the flow baffles 19 do not extend essentially lower than the level of the mixer 18. A curved bottom structure 21 together with several, advantageously downwardly pressing mixer members creates a strong vertical turbulence.

The features of a flow space 23 remaining in between the flow baffle 19 and a wall 22 correspond to those of the flow control given by the adjustable baffles 11 and 12. On the outskirts of the reactor, the liquid flowing upwardly in the flow space 23 is set into a stronger turbulent motion at the knee 20. The liquid enters the surface part in a turbulent motion and forms on the surface vortexes 24 that suck gas into the reactor. The fact that there are no flow baffles near the very bottom of the reactor further intensifies the turbulence of the reactor contents, which increases the formation of sub-vortexes.

When the above described reactor is used as a closed arrangement, it is suited for both oxidation and reduction in cases where a high efficiency of the gas consumption is particularly important. The reactor can be used for instance in sulfide precipitation, when the precipitation is carried out by feeding into the reactor hydrogen sulfide and possibly some diluting nitrogen, too. The use of a similar reactor as an open arrangement results in an excellent aeration of the reactor content. The reaction can also be used for oxidation with air.

It is obvious that in addition to the embodiments illustrated in the appended drawings, within the scope of the invention there can also be formed other flow baffle arrangements owing to which gas can be effectively sucked from the liquid surface into the liquid phase.

We claim:

1. A method for forming controlled vortexes and for recirculating gas thereby in a reactor containing liquid or a suspension of liquid and solids, into which reactor there also is fed gas, so that the liquid is set into a turbulent motion by means of a mixer member and flow baffles, characterized in that in the reactor there are formed, by means of the flow baffle members, at least two vortexes external to the shaft of the mixer member, the suction force of the said vortexes being adjustable, so that gas is sucked from the suspension surface into the liquid phase by means of the said vortexes.

2. An apparatus for forming controlled vortexes and for recirculating gas thereby in a reactor (1, 15) containing liquid or a suspension of liquid and solids, the said reactor comprising at least a bottom (2, 21) and a wall part (3, 22), so that the liquid is set into a turbulent motion by means of at least one mixer (4, 17, 18) suspended from an shaft (5, 16), and that the reactor is provided with essentially vertical flow baffles (6) located on the reactor walls, characterized in that the flow baffles (6, 19) arranged in the reactor (1) and extending from top to bottom at least to the height of the mixer, are installed to be adjustable.

3. An apparatus according to claim 2, characterized in that the flow baffles (6, 19) arranged in the wall parts (3, 22) of the reactor extend as far as the height of the lowest mixer (18).

4. An apparatus according to claim 2, characterized in that in the area left in between the wall flow baffles (6) and the mixer (4), there are provided additional flow baffles (7).

5. An apparatus according to claim 2, characterized in that the additional flow baffles are essentially vertical, and that their bottom edge (8) extends to the vicinity of the mixer (4).

6. An apparatus according to claim 2, characterized in that the mutual positions of the wall flow baffles (6) and the additional flow baffles (7) are adjustable.

7. An apparatus according to claim 2, characterized in that the reactor (1) is provided with at least two mixers (17, 18) arranged on the same shaft (5, 16), and that the knees (20) of the flow baffles are in the vertical direction positioned in between the mixers.

8. An apparatus according to claim 2, characterized in that the wall flow baffles (6) are formed of two elements (11, 12), at least one of which is adjustable.

9. An apparatus according to claim 8, characterized in that the elements (11, 12) of the wall flow baffles are adjusted with intermediation of the adjusting axes (12, 14) thereof.

10. An apparatus according to claim 2, characterized in that the wall flow baffles (6) form at least one knee (20) directed towards the central part of the reactor.

11. An apparatus according to claim 10, characterized in that the knee (20) is adjustable.

12. An apparatus according to claim 10, characterized in that the reactor (1) is provided with at least two mixers (17, 18) arranged on the same shaft (5, 16), and that the knees (20) of the flow baffles are in the vertical direction positioned in between the mixers.

* * * * *